United States Patent [19]

Tonutti

[11] Patent Number: 5,313,772
[45] Date of Patent: May 24, 1994

[54] RAKE COMPONENT SYSTEM AND METHOD

[75] Inventor: Carletto Tonutti, Tricesimo, Italy
[73] Assignee: Tonutti S.P.A., Italy
[21] Appl. No.: 23,076
[22] Filed: Feb. 26, 1993

Related U.S. Application Data

[63] Continuation-in-part of Ser. No. 924,743, Aug. 4, 1992, Pat. No. 5,263,306, which is a continuation-in-part of Ser. No. 774,712, Oct. 19, 1991, Pat. No. 5,231,829.

[51] Int. Cl.$^5$ .......................................... A01D 78/14
[52] U.S. Cl. ...................................... 56/377; 56/15.9; 56/16.2; 56/384; 56/DIG. 14; 56/DIG. 21
[58] Field of Search ................. 56/15.9, 377, 16.1, 56/16.2, 16.3, 15.5, 384, 350, 367, 378, 379, 341, DIG. 10, DIG. 14, DIG. 21

[56] References Cited

U.S. PATENT DOCUMENTS

| | | | |
|---|---|---|---|
| 4,183,198 | 1/1980 | Sligter | 56/377 |
| 4,245,458 | 1/1981 | Smith | 56/377 |
| 4,947,631 | 8/1990 | Kuehn | 56/377 |
| 4,974,407 | 12/1990 | Rowe et al. | 56/377 |
| 4,977,734 | 12/1990 | Rowe et al. | 56/15.9 |
| 5,127,216 | 7/1992 | Kelderman | 56/377 X |
| 5,155,986 | 10/1992 | Kelderman | 56/365 |

*Primary Examiner*—Stephen J. Novosad
*Attorney, Agent, or Firm*—Andrus, Sceales, Starke & Sawall

[57] ABSTRACT

A rake component system consists of a tool bar frame member, a pair of rake assemblies, a pair of pivot heads for mounting the rake assemblies to the tool bar frame member, a lifting and lowering assembly, a three-point hitch assembly mountable to the tool bar frame member and a pull-type hitch assembly mountable to the tool bar frame member. These components are shipped to a dealer or assembler in a knocked-down condition. When desired, the rakes and pivot heads are mounted to the tool bar frame member. Either the three-point hitch assembly or the pull-type hitch assembly is mounted to the tool bar frame member, depending upon the particular configuration desired. The lifting and lowering assembly, which consists of a linkage connected to the rake pivot heads and an extendible and retractable cylinder connected to the linkage, is then mounted to tool bar frame member.

13 Claims, 9 Drawing Sheets

RAKE COMPONENT SYSTEM AND METHOD

CROSS REFERENCE TO RELATED APPLICATION

This application is a continuation-in-part of application Ser. No. 07/924,743, filed Aug. 4, 1992, now U.S. Pat. No. 5,263,306, which is in turn a continuation-in-part of application Ser. No. 07/774,712 filed Oct. 19, 1991, now U.S. Pat. No. 5,231,829.

BACKGROUND OF THE INVENTION

The present invention regards a rake trolley with adjustable working widths suitable for three-point hitch finger wheel rakes characterized by the fact that the trolley is suitable for the majority of hay rakes having a standard international three-point hitch. Two hay rakes can be assembled onto this trolley without further modifications, devices or adapting clamps.

Furthermore, the structure in a working phase can be regulated to different widths without having to modify the optimal angle of inclination of the two rakes, allowing the rake wheels to always have a gentle contact with the forage to be harvested. This aspect of the invention drastically reduces the loss of leaves and thus improves remarkably the nutritive value of the forage. The trolley includes two movable heads (right hand and left hand) that slide on the main frame towards the inside and outside, which allow an operator to modify the working width of the machine, modifying at the same time, in equal measurement, the formation of the back row without modifying the inclination of the two hay rakes.

The two movable heads, able to support hay rakes with a standard international three-point hitch, are actioned by two hydraulic cylinders that allow the rotation on a pivot of the two hay rakes from a working position (lowered) to a transport position (lifted) thus avoiding waste of time on the operator's behalf who does not have to intervene manually, as happens in other known implements, to modify the positions of the two hay rakes.

The cylinders that rotate the two movable heads can be used in four different ways 1) Single hydropneumatic effect with single action as per FIG. 1; 2) Single hydropneumatic effect with double action as per FIG. 2; 3) Double effect single action as per FIG. 3; 4) Double effect double action as per FIG. 4.

This feature allows the maximum flexibility in the use of the two hay rakes which can be adapted onto all types of tractors, from simple, older tractors with only one hydraulic connector (FIG. 1) or on the more modern tractors with four hydraulic connectors (FIG. 4).

The rake trolley has been designed so as to make it easy to disassemble and to reduce to a minimum its space volume, a very important factor in the cost of transport and in particular for the shipping of containers.

At the present state of technology, fixed rakes exist (assembled on structures and carried on three-point hitch on the tractor or on trolleys always attached to the tractor) and other variable parallelogram structures (assembled on wheels) keeping the carrying structure parallel to the ground.

The present invention overcomes the structural complexity of the existing implements with a structure that is simply to carry out and is also of a simple composition.

The rake trolley (which carries from 2 to 6 wheel rakes on each side) has a central drawbar, two rake head supports, one on each side, which are each actioned by an oleodynamic (hydraulic) cylinder on which one places the finger wheel hay rakes.

The rake head supports are orientable in the space there is (registered by hand) and directly actioned with the oleodynamic cylinders with the aid of the tractor.

In a working position, the rake wheels take up a large amount of space on the right hand and left hand side, which can be registered with its proper rods and mechanical clamps, while in a transport position, the geometrical configuration varies from the working position to an oblique lifted position reducing the side space.

One of the main aspects of the present invention is its ability to vary the width of the carriage and consequently the movable heads which support the hay rakes. This allows for one to adapt the height on the basis of the width of the windrow (whose width has been determined by the mower) improving its performance.

As an option to the invention, one can add to the drawbar, an arm carrying rake wheel that works in the middle of the two side rakes. This is to improve the result of work of the machine in particular for the central part which is not taken care of with the side rakes.

The present invention further contemplates a rake component system for assembling either a three-point hitch crop rake or a pull-type crop rake. The crop rake component system includes a tool bar; a three-point hitch assembly and a pull-type hitch assembly, both of which are mountable to the tool bar; a pair of rake assemblies mountable to the tool bar; and a lifting and lowering assembly mountable to the tool bar and to the rake assemblies. The rake assemblies are mounted to the tool bar and the lifting and lowering assembly is mounted to the tool bar and to the rake assemblies for providing movement of the rake assemblies between a lowered working position and a raised transport position. Either the three-point hitch assembly or the pull-type hitch assembly is mounted to the tool bar between the rake assemblies, for connecting the tool bar with the rake assemblies mounted thereto to a tractor.

The three-point hitch assembly includes a pair of side bracket assemblies mountable to the tool bar by means of a pair of spaced plates, and a central bracket assembly. The central bracket assembly also includes a pair of spaced plates for use in mounting the central bracket assembly to the tool bar. The central bracket assembly further includes an upstanding member extending upwardly from one of the plates, with an upper three-point hitch bracket connected to the upper end of the upstanding member.

The pull-type hitch assembly includes a pair of wheel assemblies mountable to the tool bar, and a draw bar assembly mountable to the tool bar between the wheel assemblies. A pair of plates are placed against opposite side surfaces of the tool bar for mounting the wheel assemblies thereto, and are movable along the length of the tool bar for varying the spacing between the wheel assemblies. The draw bar assembly includes a draw bar mounted to a first plate member. The first plate member is placed against a side surface of the tool bar, and a second plate member is placed against an opposite side surface of the tool bar. The first and second plate members are secured together with the tool bar therebetween for mounting the draw bar assembly to the tool bar.

The lifting and lowering assembly mountable to the tool bar consists of an extendible and retractable cylinder assembly mountable to the tool bar, and a linkage connectable between the cylinder assembly and the rake assemblies. The three-point hitch assembly and the pull-type hitch assembly each include an upstanding vertical tube member, and the extendible and retractable cylinder assembly is mountable to the vertical tube member. One of the plates of the three-point hitch assembly and the pull-type hitch assembly includes a cheek plate, and the linkage of the lifting and lowering assembly is connectable to the cheek plate and also the extendible and retractable cylinder assembly.

In addition, the lifting and lowering assembly as summarized above can be mounted in a retrofit manner to an existing rake in which the rake assemblies are manually movable between their raised and lowered positions.

Various other features, objects and advantages of the invention will be made apparent from the following description taken together with the drawings.

BRIEF DESCRIPTION OF THE DRAWINGS

The rake trolley with adjustable working widths will be better described with the help of the enclosed drawings which carry three embodiments of the invention.

In the drawings:

FIG. 12 is a top view of the third version of the rake trolley, as shown in FIG. 11a;

DETAILED DESCRIPTION OF THE INVENTION

Figure 1:
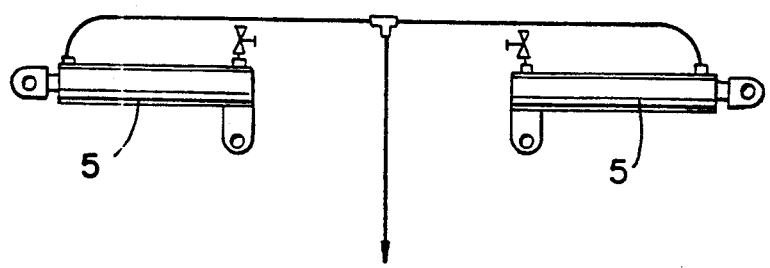
FIGS. 1-4 show various arrangements for actuating the hydraulic cylinders for rotating the movable heads of the trolleys as summarized above.
Figure 2:
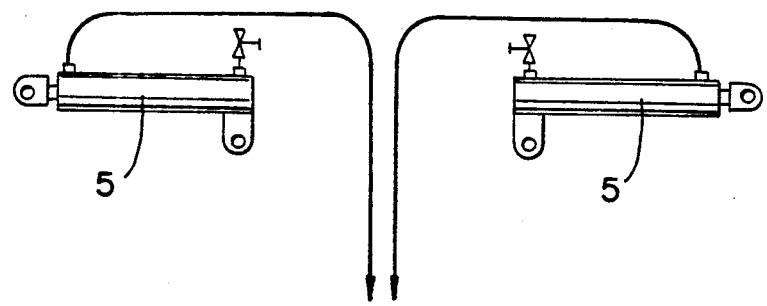
Figure 3:
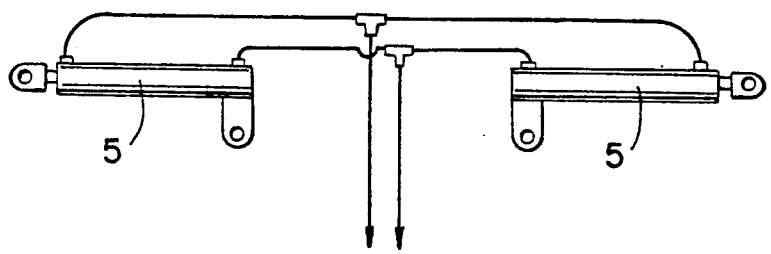
Figure 4:
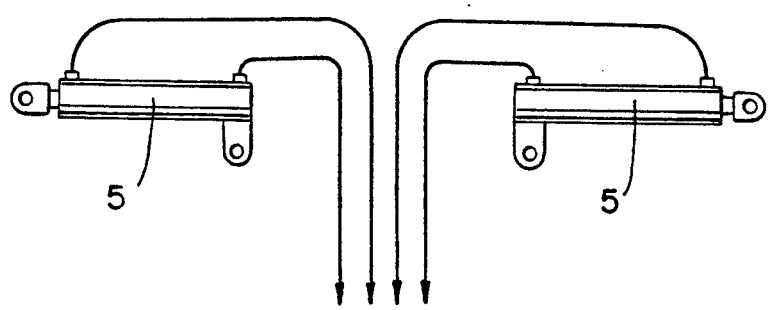
Figure 5:
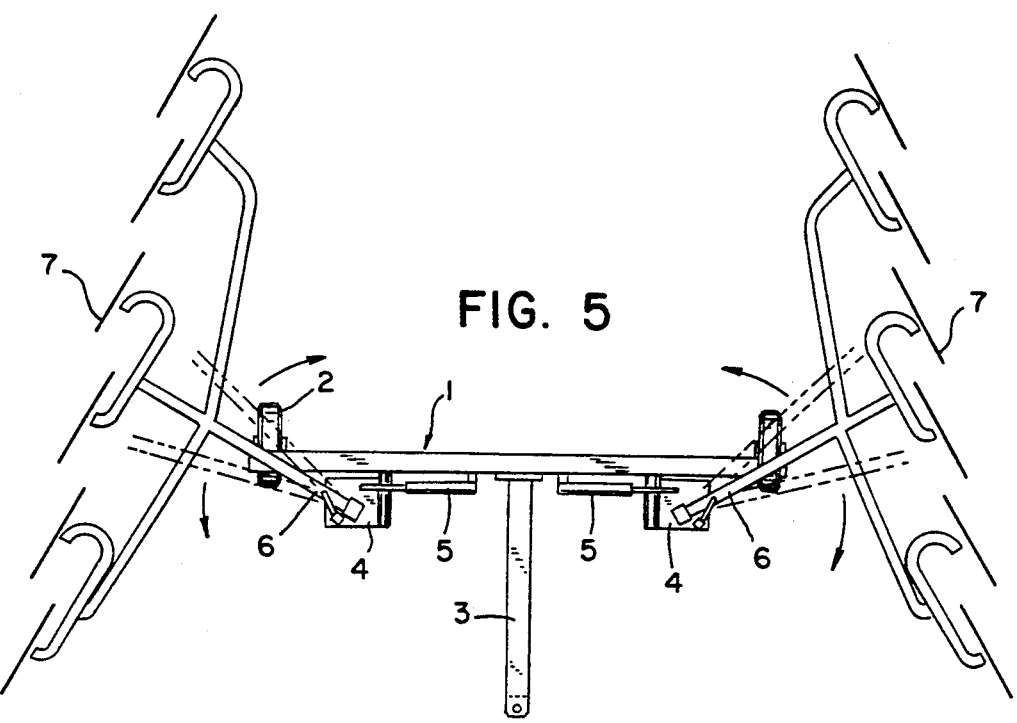
FIGS. 5 and 6 are respectively a top and front view of the trolley with the rake wheels in a lowered position which is the working position.
Figure 6:
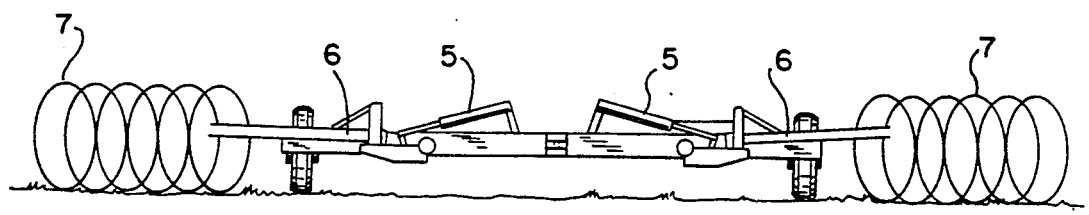
Figure 7:
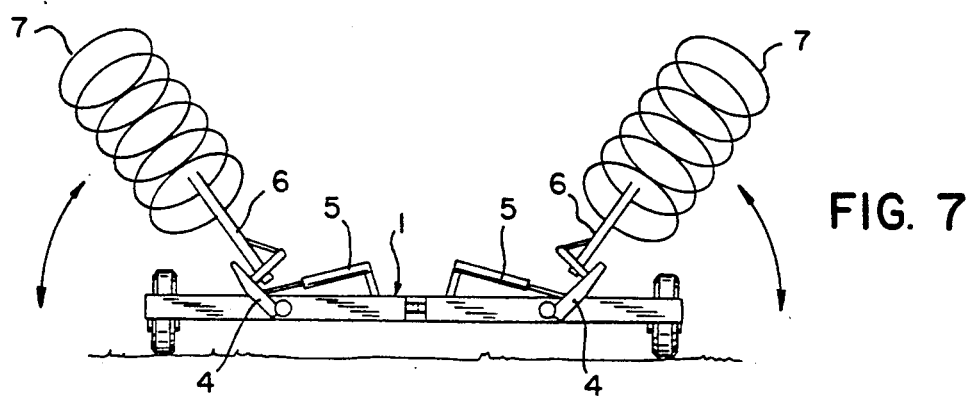
FIG. 7 is a front view of the trolley as per FIG. 6 but with the rake wheels lifted, in a transport position, by actioning the oleodynamic cylinders.

The first version (FIGS. 5-7) shows a trolley with the structure of the side rake wheels 7, which can be completely disassembled. The frame 1 consists of a bar with two pneumatic tires one on each side 2, towed by a tractor by means of a drawbar 3. On the bar frame, on the right hand and left hand side are the movable heads 4 which are actioned one at a time by oleodynamic cylinders 5. On each movable head there is an arm or frame 6 which carries the rake wheels 7.

Figure 8:
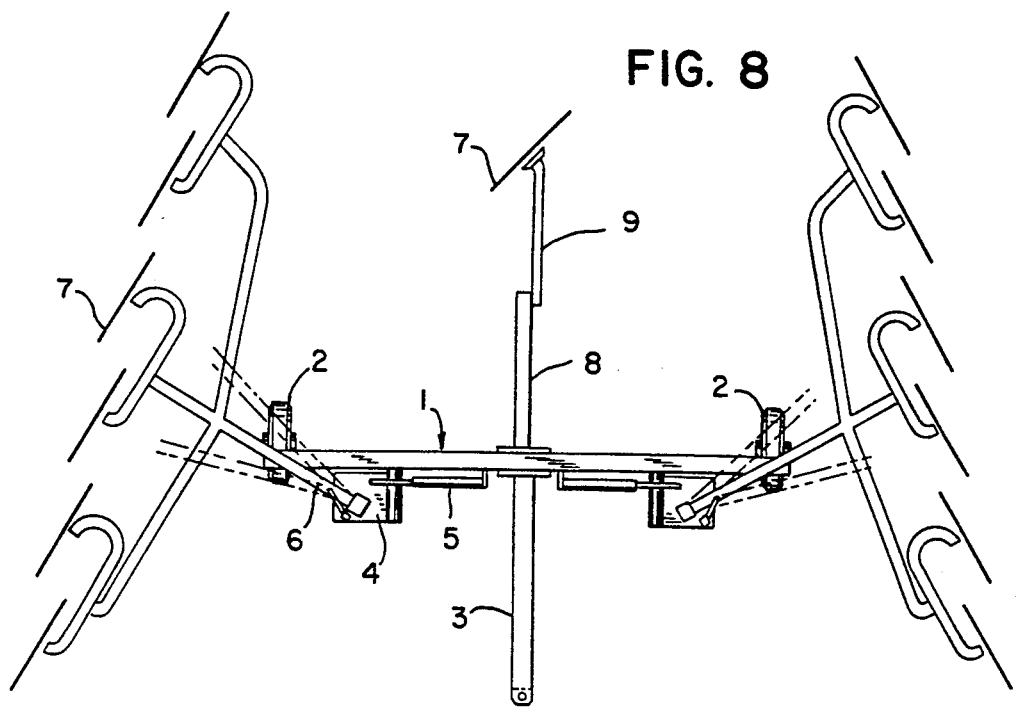
FIGS. 8 and 9 are respectively a top and front view of the trolley in the second version, with the supporting structure for the central wheel.
Figure 9:
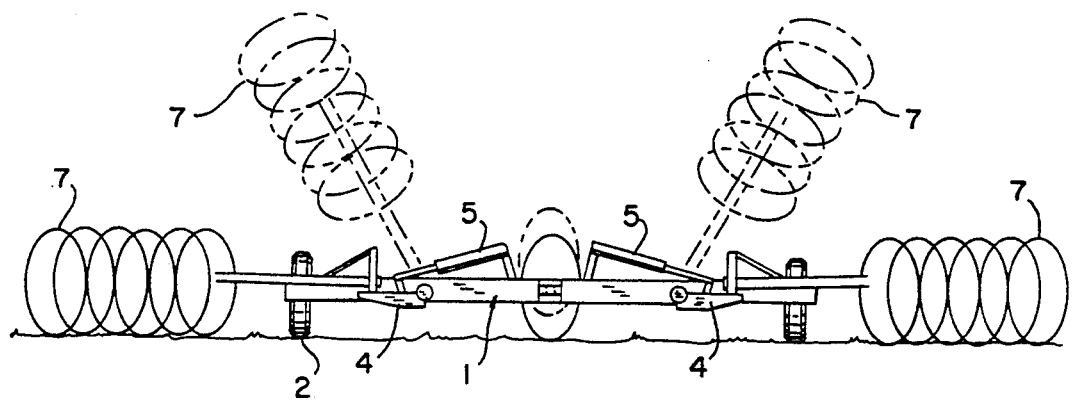
Figure 10:
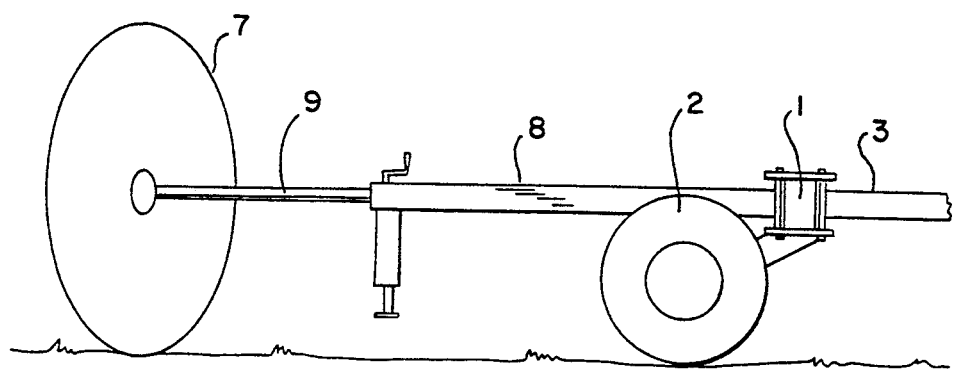
FIG. 10 is a partial side view of the rake emphasizing the central wheel and its supporting arm.

In the second version (FIGS. 8-10), all is as above with a central arm 8 on which an extension 9 has been fitted to carry the rake wheel 7.

In this version, the central wheel moves the hay and grass which has been cut in the center, which would not be touched by the side rake wheels. This central wheel is lifted from the ground in synchrony with the lifting of one of the two side rakes (e.g. with the left hand side with a steel rod or other part suitable to lift).

The movable heads, other than regulating manually for the right side position, are lifted into an oblique position by oleodynamic cylinders thus reducing the space taken up by the rakes on the sides.

In the third solution (FIGS. 11a, 12), the rake trolley has a tubular frame 1 on which the ground wheel supports have been fixed 11 and also the supports for the movable heads 4 one right hand and one left hand. These supports can be adjusted for the width along the whole frame, thus regulating the working width of the rake wheels.

Figure 11A:
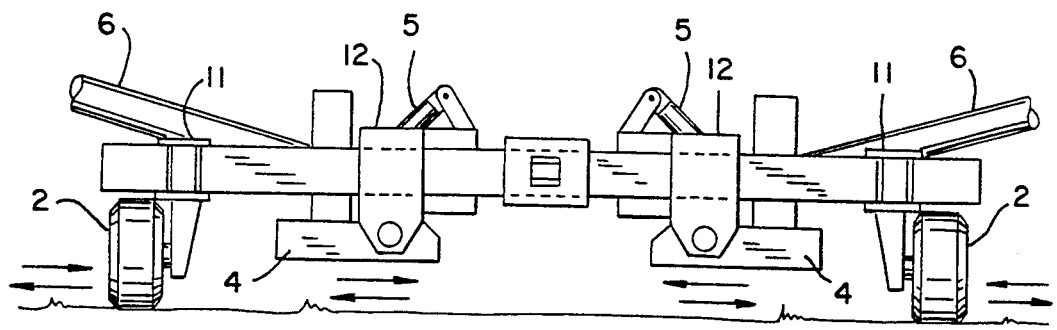
FIG. 11a is a front view of the third version of the rake trolley showing the main characteristics of the main frame that supports the heads which can be adjusted in the width on the whole frame.
Figure 12:
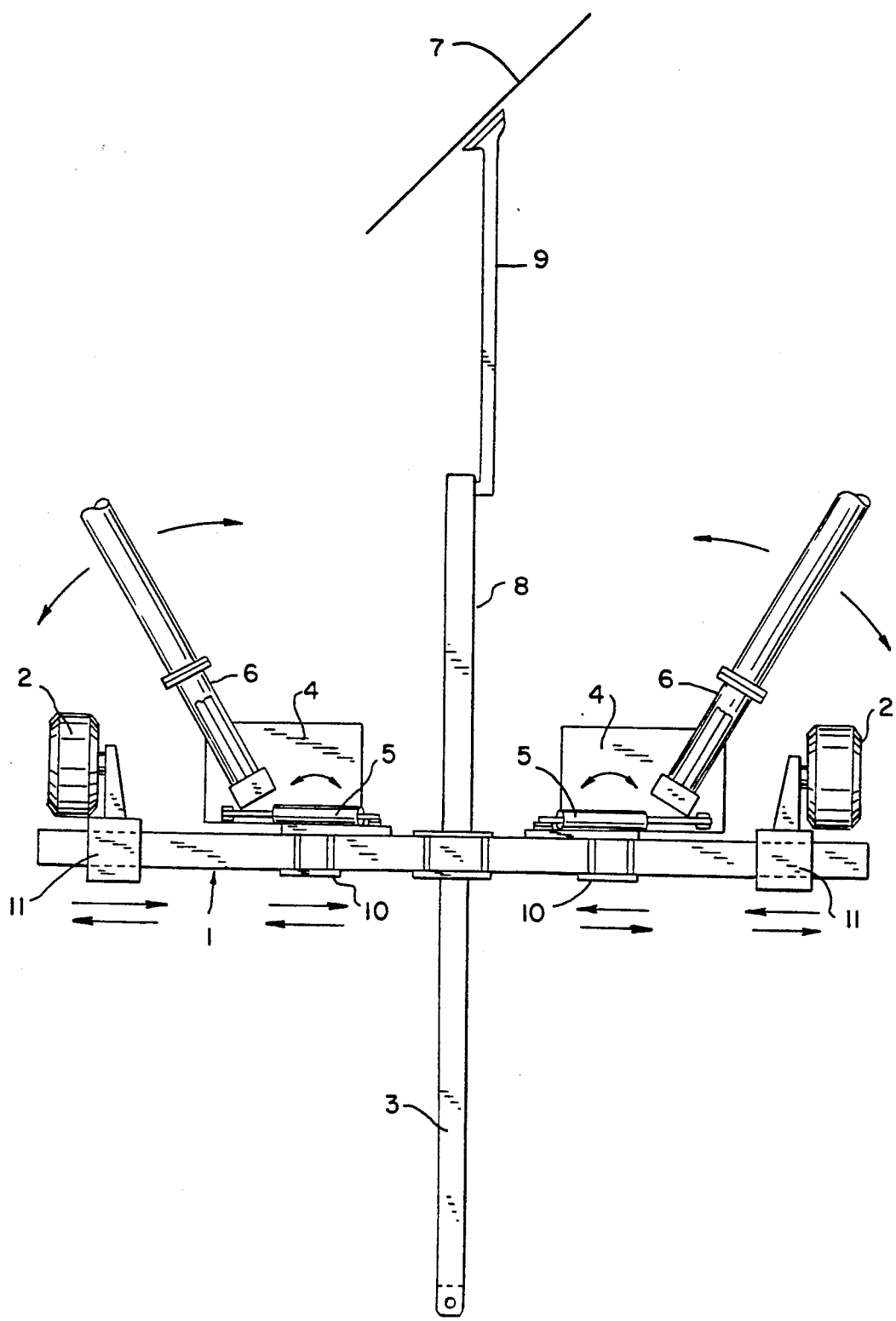

Each support includes a pair of plates located one against the forward surface of the frame 1 and the other against the rearward surface of the frame 1. The plates are connected to each other by a series of bolts which act to clamp the plates onto the frame 1 in a desired position along the length of the frame 1. As shown in FIGS. 11a and 12, the head 4 to which the rake frame 6 is mounted, is pivotably mounted to the forward plate of the support. The cylinder 5 is mounted to the rearward plate, and its rod is connected to the head 4.

In this case (FIG. 12) the central rake wheel is also shown.

The possibility to adjust the width of the movable heads can also be applied on the first two versions by replacing the support which has been fixed or welded to the frame with movable supports.

Figure 11B:
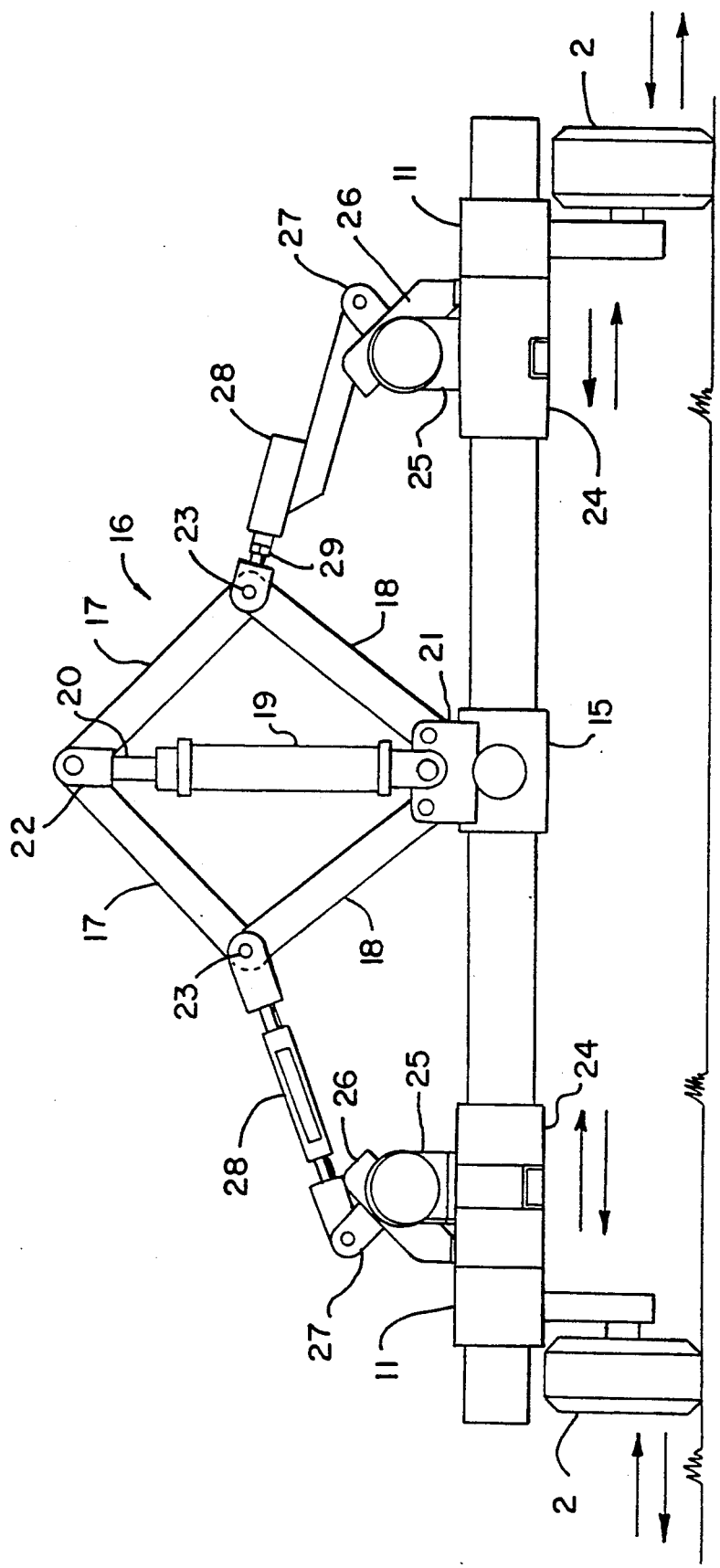
FIG. 11b is a front view of a fourth version of the rake trolley showing a cylinder and linkage arrangement for adjusting the position of the movable heads on the frame.

FIG. 11b illustrates another version of the rake trolley mounted to frame 1, to which pneumatic tires 2 are mounted one on either side of frame 1 through fixed wheel supports 11. In this version, a central bracket assembly 15 is rigidly mounted to frame 1, and a linkage assembly 16 is mounted to bracket 15. Linkage assembly 16 includes upper members 17 and lower members 18, located one on either side of the centerline of frame 1. A hydraulic cylinder 19, having an extendible and retractable rod 20, is mounted between the upper ends of upper linkage members 17 and a plate 21. Plate 21 is mounted to bracket 15, and the lower ends of lower frame members 18 and the lower end of cylinder 19 are mounted to plate 21.

The end of rod 20 is connected to a member 22, to which the upper ends of upper linkage members 17 are pivotably mounted. The lower ends of upper linkage members 17 and the upper ends of lower linkage members 18 are pivotably connected by means of pins 23.

A pair of rake head supports 24 are mounted to frame 1, in a manner similar to that in which the supports are mounted to frame 1 in the version of FIG. 11a. That is, each support 24 (FIG. 11b) includes a plate located on opposite sides of frame 1, with threaded bolts or the like extending between the plates so that supports 24 can be clamped onto frame 1 in a desired location along the length of frame 1.

A block assembly 25 is mounted to each of supports 24, and the end of a rake arm is pivotably mounted to each block assembly 25. A plate 26 is rigidly fixed to each rake arm, and an ear 27 is mounted to each plate 26.

A screw-type link assembly 28 is connected between pins 23 and ears 27, with the ends of link assemblies 28 being pivotable relative to pins 23 and ears 27. Each link assembly includes a screw member 29 for adjusting its length.

The rake trolley version of FIG. 11b is illustrated in its working position, in which rod 20 is retracted into cylinder 19. With linkage 16 in this position, plates 26 are rotated fully downwardly until engagement with supports 24, to place the rake into its working position. When rod 20 is extended to lengthen linkage assembly 16, link assemblies 28 act through ears 27 to pivot plate members 26 and to thereby raise the rake assemblies. With this arrangement, only a single hydraulic cylinder 19 is required to raise and lower the rake assemblies, instead of the two separate cylinders required in the versions of FIGS. 5–11a.

Supports 24 can be moved to varying locations along the length of frame 1, in a manner as explained previously with respect to FIG. 11a. When this is done, link members 28 can be lengthened or shortened by means of screw members 29, to accommodate the varying positions of supports 24 along the length of frame 1.

FIGS. 13–18 illustrate a rake component assembly for use in assembling either a three-point hitch rake assembly or a pull-type hitch rake assembly. In each version, a pair of rake assemblies are mounted to a tool bar by pivot heads such as shown in FIG. 11b, and linkage assembly 16 and hydraulic cylinder 19 having a rod 20 are also mounted to the tool bar for providing pivoting movement of the rake assemblies between their lowered working position and their raised transport position.

Figure 13:
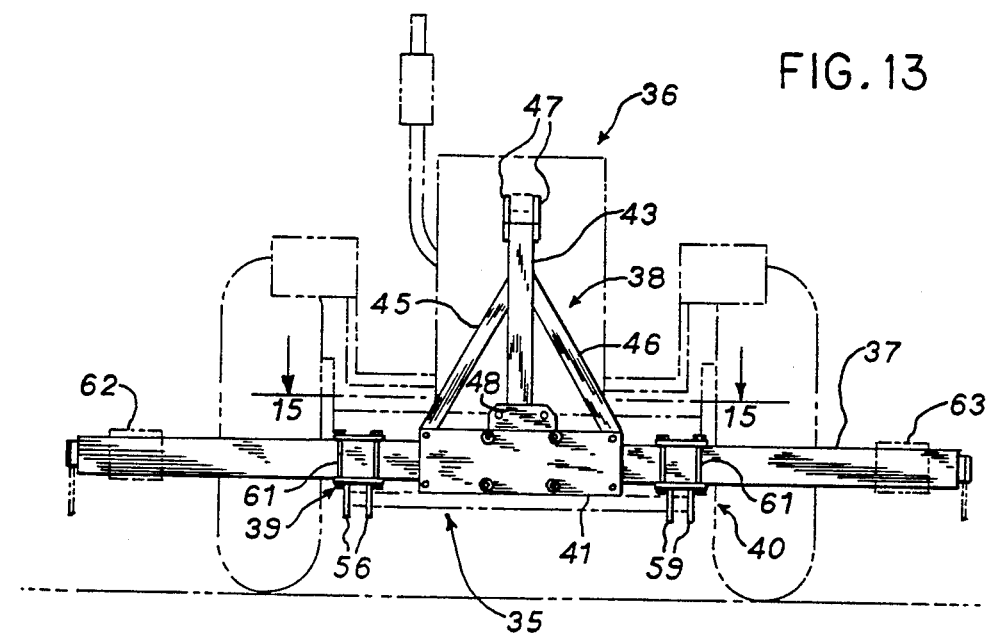
FIG. 13 is a rear elevation view of an assembled three-point hitch rake assembly constructed according to the invention.
Figure 14:
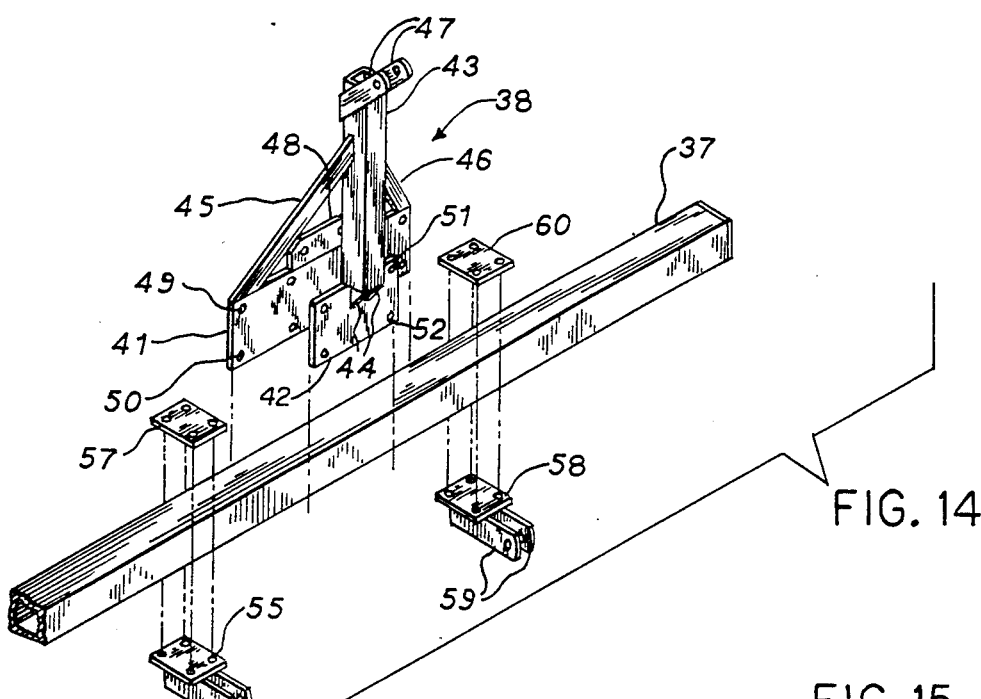
FIG. 14 is an exploded isometric view showing the components of the three-point hitch rake assembly of FIG. 13.
Figure 15:
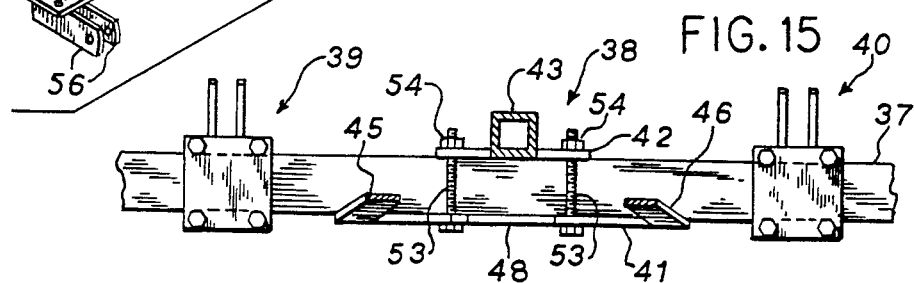
FIG. 15 is a partial top plan view of the three-point hitch rake assembly of FIG. 13, reference being made to line 15—15 of FIG. 13.

Referring to FIGS. 13–15, a three-point hitch rake assembly 35 is mounted to the three-point hitch provided on the rear of a tractor, shown in phantom at 36. Three-point hitch rake assembly 35 consists of an elongated tubular tool bar frame member 37 and a three-point hitch assembly consisting of a central bracket assembly 38, a left side bracket assembly 39 and a right side bracket assembly 40.

As shown in FIG. 14, central bracket assembly 38 consists of a rear plate 41 and a front plate 42. An upstanding vertical tube 43 is connected to the upper edge of front plate 42, and is supported by a pair of gusset members 44. A pair of angled supports 45, 46 are connected between the upper edge of rear plate 41 and the side surfaces of vertical tube 43, for providing support to vertical tube 43. A pair of upper hitch plates 47 are connected to the upper end of vertical tube 43.

A cheek plate 48 is welded to the upper edge of rear plate 41.

A series of aligned upper openings 49 are formed in the upper portion of rear plate 41, and a series of aligned lower openings 50 are formed in the lower portion of rear plate 41. Similarly, a pair of aligned upper openings 51 are formed in the upper portion of front plate 42, and a pair of aligned lower openings 52 are formed in the lower portion of front plate 42.

To mount central bracket assembly 38 to frame member 37, rear plate 41 is placed against the rear surface of frame member 37 and front plate 42 is placed against the front surface of frame member 37. Upper openings 49, 51 in rear and front plates 41, 42, respectively are located just above the upper surface of frame member 37, and lower openings 50, 52 in rear and front plates 41, 42, respectively are located just below the lower surface of frame member 37. Threaded bolts, such as shown in FIG. 15 at 53 are inserted through the central pair of openings 49 and through openings 51, and likewise a pair of bolts are inserted through the central pair of openings 50 and openings 42. Nuts 54 are threaded onto bolt 53 for clamping frame member 37 between rear and front plates 41, 42, respectively to mount central bracket assembly 38 to the center of frame member 37.

Left bracket assembly 39 includes a lower plate 55 to which a pair of hitch plates 56 are mounted, and an upper plate 57. Similarly, right bracket assembly 40 includes a lower plate 58 to which a pair of hitch plates 59 are mounted, and an upper plate 60. Openings are formed in each corner of lower plates 55, 58 and upper plates 57, 60. A pair of bolts 61 extend through the aligned openings in the corners of plates 55, 57 adjacent the rear surface of frame member 37, and also through the aligned openings in plates 55, 57 adjacent the front surface of frame member 37. Nuts are secured to bolts 61 for clamping left bracket assembly 39 in a desired position on frame member 37. Bolts 61 and nuts are similarly employed to clamp plates 58, 60 of right bracket assembly 40 in a desired position on frame member 37.

Once central bracket assembly 38 and left and right side bracket assemblies 39, 40 are clamped in position on frame member 37, the openings in hitch plates 47 of central bracket assembly 38 and in hitch plates 56, 59 of left and right side bracket assemblies 39, 40, respectively are engageable with the three-point hitch of tractor 36 for mounting three-point hitch rake assembly 35 to tractor 36 in a manner as is known.

Additionally, a pair of rake assemblies such as shown in FIGS. 5–12 are mounted to frame member 37, with one rake being mounted adjacent each end of frame member 37. The rakes are mounted to frame member 37 by pivot head assemblies, preferably such as illustrated in FIG. 11b. Referring to FIG. 13, the pivot head mounting mechanisms are representatively illustrated in phantom at 62, 63. As explained previously, this type of mounting arrangement allows the operator to vary the distance between the rake assemblies, to control the width of the windrow created upon use of rake assembly 35. Similarly, a linkage assembly 16 and hydraulic cylinder 19 and rod 20 as shown in FIG. 11b are mounted to three-point hitch rake assembly 35. Cheek plate 48 takes the place of plate 21 (FIG. 11b) to mount the lower ends of link members 18 and the lower end of hydraulic cylinder 19. In addition, vertical tube 43 is used to fixedly mount the upper end of hydraulic cylinder 19.

Figure 16:
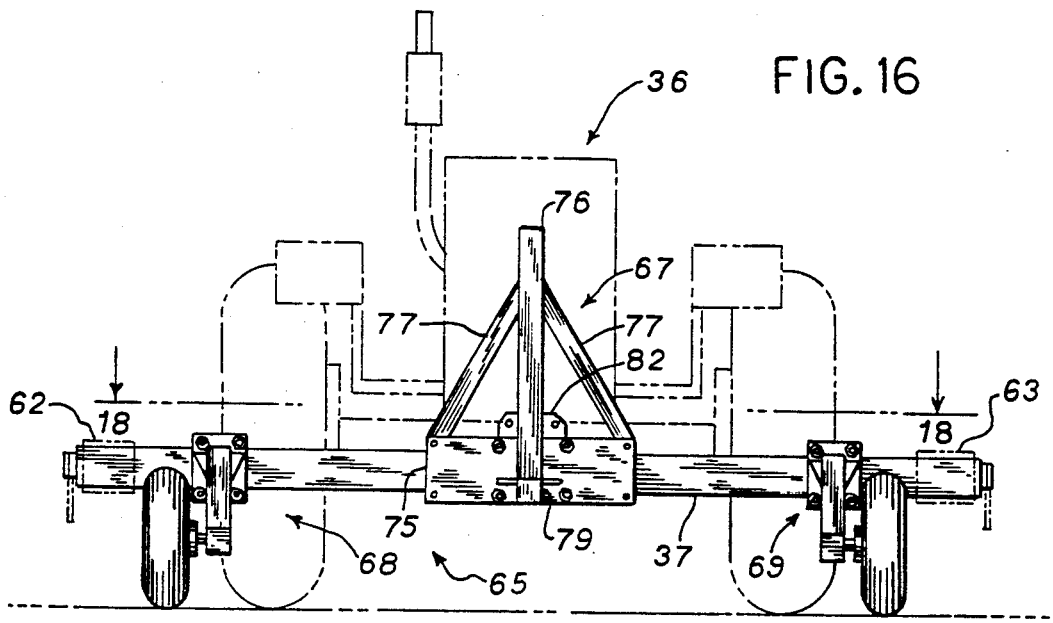
FIG. 16 is a rear elevation view of a pull-type hitch rake assembly constructed according to the invention.
Figure 17:
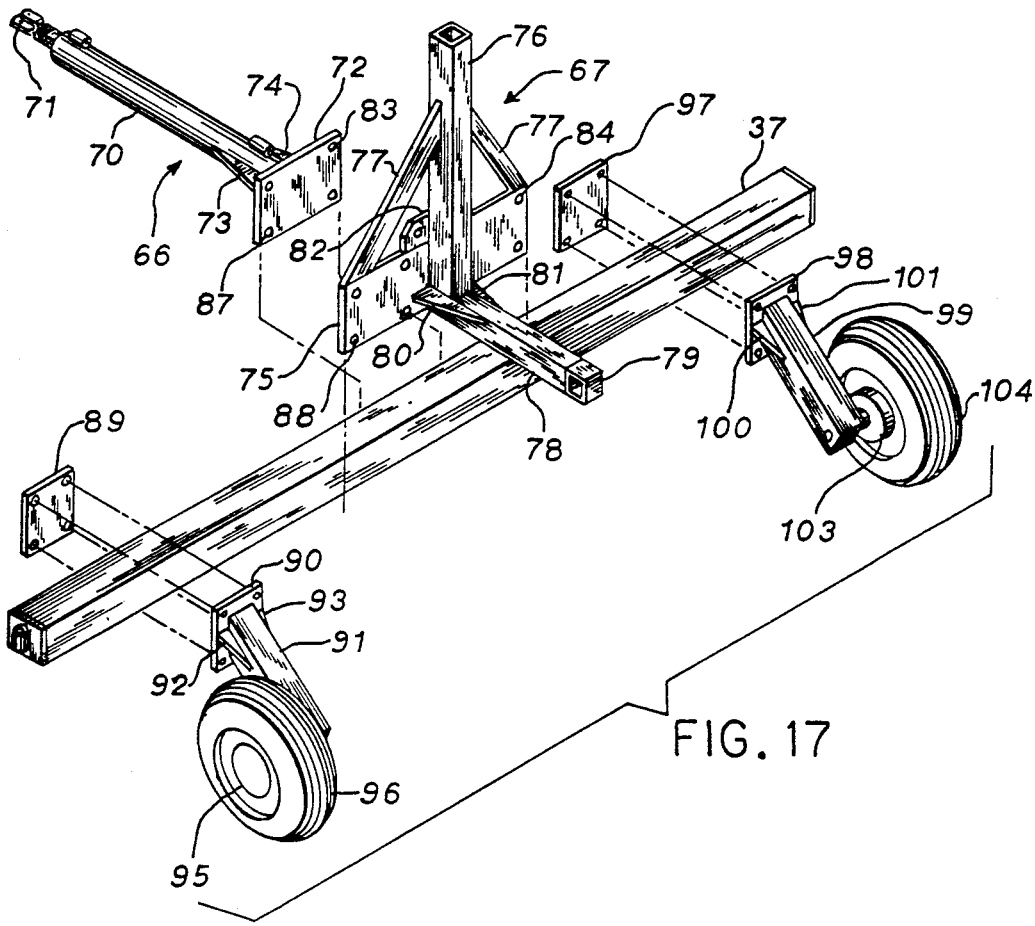
FIG. 17 is an exploded isometric view showing the components of the pull-type hitch rake assembly of FIG. 16.
Figure 18:
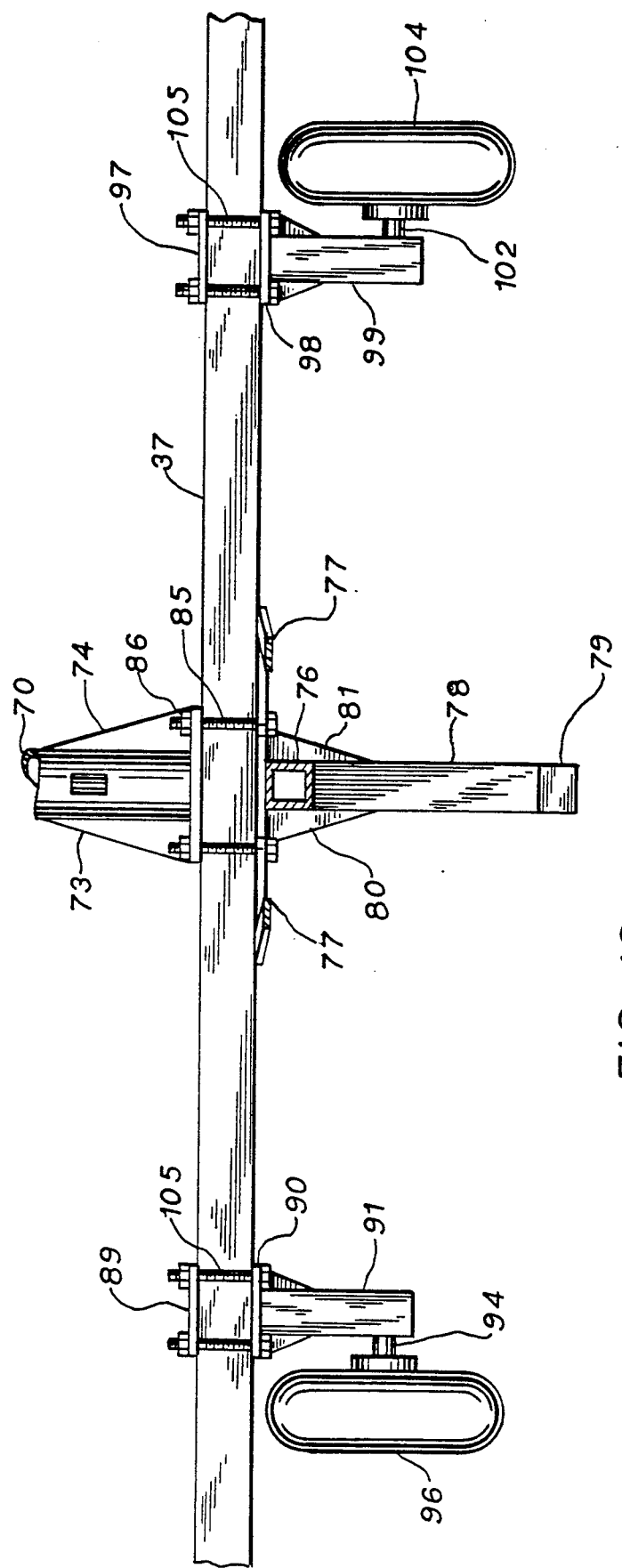
FIG. 18 is a partial top plan view of the pull-type hitch rake assembly of FIG. 16, reference being made to line 18—18 of FIG. 16.

FIGS. 16–18 illustrate a pull-type hitch rake assembly 65 for being drawn by tractor 36. Pull-type hitch rake assembly 65 again includes elongated tubular tool bar frame member 37, as in three-point hitch rake assembly 35. In addition, pull-type hitch rake assembly 65 includes a pull-type hitch assembly consisting of a draw bar assembly 66, a central bracket assembly 67, a left wheel assembly 68 and a right wheel assembly 69.

Draw bar assembly 66 includes a draw bar 70 defining a forward end and a rearward end. A mounting bracket 71 is mounted to the forward end of draw bar 70, for receiving the draw tongue of tractor 36. A vertical plate 72 is mounted to the rearward end of draw bar 70, and a pair of reinforcing gusset plates 73 are connected between draw bar 70 and vertical plate 72.

Central bracket assembly 67 includes a vertical plate 75 and an upstanding vertical tube 76 connected to the rearward surface of plate 75. A pair of angled support members 77 are connected between the upper edge of plate 75 and the sides of vertical tube 76. A lift arm 78 is connected to and extends rearwardly from the rear surface of plate 75, below the lower end of vertical tube 76. A lift collar 79 is mounted to the outer end of lift arm 78. Lift collar 79 defines a lateral passage for receiving a horizontal member associated with a parking stand (not shown).

Reinforcing gussets 80, 81 are connected between the rear surface of plate 75 and the sides of lift arm 78.

A cheek plate 82 is mounted to the upper edge of plate 75.

Draw bar assembly 66 is mounted to frame member 37 by positioning vertical plate 72 against the front surface of frame member 37, and positioning vertical plate 75 of central bracket assembly 67 against the rear surface of frame member 37. A pair of upper openings 83 are provided in draw bar assembly plate 72, and a series of aligned upper openings 84 are provided in central bracket assembly plate 75. Bolts 85 (FIG. 18) extend through upper openings 83 and the central pair of upper openings 84, and nuts 86 are used to clamp plates 72, 75 together with frame member 37 therebetween. Similarly, a pair of lower openings 87 are formed in draw bar assembly plate 72, and a series of aligned lower openings 88 are formed in the lower portion of central bracket assembly plate 75. Bolts 85 extend through lower openings 87 in plate 72 and through the central pair of lower openings 88 in plate 75, and nuts 86 are employed to again clamp plates 72, 75 together adjacent the lower surface of frame member 37. With this arrangement, draw bar assembly 66 and central bracket assembly 67 are securely clamped at the center of frame member 37.

Left wheel assembly 68 includes a front plate 89, a rear plate 90, and a tubular wheel support 91 extending downwardly and rearwardly from rear plate 90. Gussets 92, 93 reinforce the connection of wheel support 91 to rear plate 90. A stub axle 94 (FIG. 18) is connected to the outer end of wheel support 91, and a wheel 95, to which a tire 96 is mounted, is rotatably mounted to stub axle 94. Similarly, right wheel assembly 69 includes a front plate 97, a rear plate 98 and a tubular wheel support 99 extending downwardly and rearwardly from rear plate 98. Gussets 100, 101 reinforce the connection of wheel support 99 to rear plate 98. A stub axle 102 is mounted to the outer end of wheel support 99. A wheel 103, to which a tire 104 is mounted, is rotatably mounted to stub axle 102.

Referring to FIG. 18, a series of bolts 105 extend between aligned openings formed adjacent the corners of front and rear plates 89, 90 to mount left wheel assembly 68 to frame member 37. Similarly, bolts 105 extend through aligned openings formed adjacent the corners of front and rear plates 97, 98 to mount right wheel assembly 69 to frame member 37.

As with three-point hitch rake assembly 35 of FIGS. 13-15, a pair of rakes are mounted to frame member 37 outboard of wheel assemblies 68, 69 through pivoting rake mounting head assemblies, shown schematically in FIG. 16 at 62, 63. As in the embodiment of FIG. 11b, linkage assembly 16 and hydraulic cylinder 19 having an extendible and retractable rod 20 are employed to move the rake assemblies between their lowered working position and their raised transport position. Vertical tube 76 is employed to support the upper end of cylinder 19. Cheek plate 82 is used in place of plate 21 (FIG. 11b) to pivotably mount the lower ends of link members 18 and the lower end of cylinder 19.

In use, the present invention allows a manufacturer to construct and ship certain components and assemblies for constructing a rake. Representatively, the components are as follows:

1. a number of frame members 37;
2. a pair of rakes for each frame member 37, each rake consisting of a series of rake wheels 7 mounted to an arm or frame 6;
3. a pivotable rake head support 24 (FIG. 11b) for each rake (as illustrated in FIGS. 13 and 16 at 62, 63);
4. a number of three-point hitch central bracket assemblies 38;
5. a number of three-point hitch side bracket assemblies 39, 40;
6. a number of pull-type hitch assemblies, each consisting of a draw bar assembly 66 and a central bracket assembly 67;
7. a number of left side wheel assemblies 68; and
8. a number of right side wheel assemblies 69.

The above-enumerated components are shipped in knocked-down form to a dealer or other assembler, thus substantially reducing the volume occupied by such components when compared to the volume required for an assembled rake. This results in significantly lower shipping cost.

At the dealer or other assembler, the desired components are assembled as discussed above with respect to FIGS. 13-15 to construct a three-point hitch V-rake, and as discussed above with respect to FIGS. 16-18 to construct a pull-type hitch rake.

It is well understood that this trolley is not limited to the examples carried here in. On the basis of this machine one can provide other shapes, other ways of production and the particulars used can be modified without changing the results obtained with this rake trolley.

I claim:

1. A method of assembling a crop rake, comprising the steps of:
   providing a tool bar;
   providing a three-point hitch assembly mountable to the tool bar;
   providing a pull-type hitch assembly mountable to the tool bar;
   providing a pair of rake assemblies mountable to the tool bar;
   providing a lifting and lowering assembly mounted to the tool bar and to the rake assemblies;
   mounting the rake assemblies to the tool bar, and mounting the lifting and lowering assembly to the tool bar and to the pair of rake assemblies for providing movement of the rake assemblies between a lowered working position and a raised transport position; and mounting one of the three-point hitch assembly and the pull-type hitch assembly to the tool bar between the rake assemblies for use in connecting the tool bar with the rake assemblies mounted thereto to a tractor.

2. The method of claim 1, wherein the step of providing a tool bar comprises providing an elongated tubular tool bar frame member.

3. The method of claim 2, wherein the step of providing a three-point hitch assembly comprises providing a pair of side bracket assemblies mountable to the tool bar frame member and a central bracket assembly mountable to the tool bar frame member between the side bracket assemblies.

4. The method of claim 3, wherein each side bracket assembly includes a first plate member, and wherein the step of mounting the three-point hitch assembly comprises providing a second plate member for each side bracket assembly, placing the first and second plate members adjacent opposite surfaces of the tool bar frame member, and securing the first and second plate members together with the tool bar frame member therebetween for mounting each side bracket assembly to the tool bar frame member.

5. The method of claim 3, wherein the central bracket assembly comprises a pair of spaced plate members and an upstanding member extending upwardly from one of the plate members, and wherein the step of mounting the three-point hitch assembly comprises placing the plate members of the central bracket assembly adjacent opposite surfaces of the tool bar frame member, and securing the plate members together with the tool bar frame member therebetween for mounting the central bracket assembly to the tool bar frame member.

6. The method of claim 2, wherein the step of providing a pull-type hitch assembly comprises providing a pair of wheel assemblies mountable to the tool bar frame member and providing a draw bar assembly mountable to the tool bar frame member between the wheel assemblies.

7. The method of claim 6, wherein each wheel assembly includes a first plate member, and wherein the step of mounting the pull-type hitch assembly comprises providing a second plate member for each wheel assembly, placing the first and second plate members adjacent opposite surfaces of the tool bar frame member, and securing the first and second plate members together with the tool bar frame member therebetween for mounting each wheel assembly to the tool bar frame member.

8. The method of claim 6, wherein the draw bar assembly includes a draw bar mounted to a first plate member, and wherein the step of mounting the draw bar assembly comprises providing a second plate member, placing the first and second plate members adjacent opposite surfaces of the tool bar frame member, and securing the first and second plate members together with the tool bar frame member therebetween for mounting the draw bar assembly to the tool bar frame member.

9. The method of claim 8, further comprising the step of mounting a lift arm to the second plate member for use in raising and lowering the rake assembly relative to the ground.

10. The method of claim 8, wherein the step of providing a lifting and lowering assembly mountable to the tool bar comprises providing an extendible and retractable cylinder assembly mountable to the tool bar frame member and a linkage connectable between the cylinder assembly and the rake assemblies.

11. The method of claim 10, wherein the step of providing a second plate member comprises providing an assembly including the second plate member and an upstanding member mounted to and extending upwardly from the second plate member, and wherein the step of mounting the lifting and lowering assembly comprises connecting the extendible and retractable cylinder assembly to the upstanding member.

12. The method of claim 10, wherein the step of mounting the lifting and lowering assembly comprises mounting a cheek plate to the second plate member, and connecting the linkage to the cheek plate and also to the extendible and retractable cylinder assembly.

13. A crop rake component system, comprising:
a tool bar;
a three-point hitch assembly mountable to the tool bar;
a pull-type hitch assembly mountable to the tool bar;
a pair of rake assemblies mountable to the tool bar;
a lifting and lowering assembly mountable to the tool bar and to the rake assemblies;
wherein the rake assemblies are mounted to the tool bar and the lifting and lowering assembly is mounted to the tool bar and to the rake assemblies for providing movement of the rake assemblies between a lowered working position and a raised transport position; and
wherein one of the three-point hitch assembly and the pull-type hitch assembly is mounted to the tool bar between the rake assemblies for connecting the tool bar with the rake assemblies mounted thereto to a tractor.

* * * * *